United States Patent
Heaton et al.

(10) Patent No.: US 6,603,633 B2
(45) Date of Patent: Aug. 5, 2003

(54) PARALLEL SPRING DESIGN FOR ACOUSTIC DAMPING OF A DISC DRIVE

(75) Inventors: Daniel M. Heaton, Yukon, OK (US); Curtis A. Trammell, Newcastle, OK (US); Roy L. Wood, Yukon, OK (US); John D. Stricklin, Oklahoma City, OK (US); Gary A. Treleven, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 103 days.

(21) Appl. No.: 09/925,358

(22) Filed: Aug. 9, 2001

(65) Prior Publication Data

US 2002/0135945 A1 Sep. 26, 2002

Related U.S. Application Data

(60) Provisional application No. 60/277,784, filed on Mar. 21, 2001.

(51) Int. Cl.[7] .............................................. G11B 33/14
(52) U.S. Cl. ..................................................... 360/97.02
(58) Field of Search ........................... 360/97.01–97.04

(56) References Cited

U.S. PATENT DOCUMENTS

| | | |
|---|---|---|
| 5,214,549 A | 5/1993 | Baker et al. |
| 5,430,589 A | 7/1995 | Moir et al. |
| 5,483,397 A | 1/1996 | Gifford et al. |
| 5,517,375 A | 5/1996 | Dion et al. |
| 5,825,585 A | 10/1998 | Hatam-Tabrizi |
| 5,914,836 A | 6/1999 | Pottebaum |
| 5,999,374 A | 12/1999 | Kim |
| 6,002,546 A | 12/1999 | Yagi et al. |
| 6,175,469 B1 | 1/2001 | Ahmad et al. |
| 6,288,866 B1 * | 9/2001 | Butler ..................... 360/97.01 |

FOREIGN PATENT DOCUMENTS

| | | |
|---|---|---|
| EP | 0 874 175 A2 | 10/1998 |
| GB | 2336238 A | 10/1999 |

* cited by examiner

*Primary Examiner*—A. J. Heinz
(74) *Attorney, Agent, or Firm*—Fellers, Snider, et al.

(57) ABSTRACT

A beam damper for damping acoustic noise generated by an actuator of a disc drive. The beam damper is compressed between a portion of a housing of the disc drive and an actuator motor. The beam damper includes a substantially flat platform affixed to a selected one of the housing and an upper or lower pole of the actuator motor. A plurality of flex beams extend from the platform at a selected angle and contact the remaining one of the housing and the upper or lower pole to resiliently bias the housing with respect to the actuator motor. The beam damper is preferably formed from a sheet of ductile metal which is stamped to form the platform and flex beams, after which the flex beams are bent to the desired angle.

20 Claims, 5 Drawing Sheets

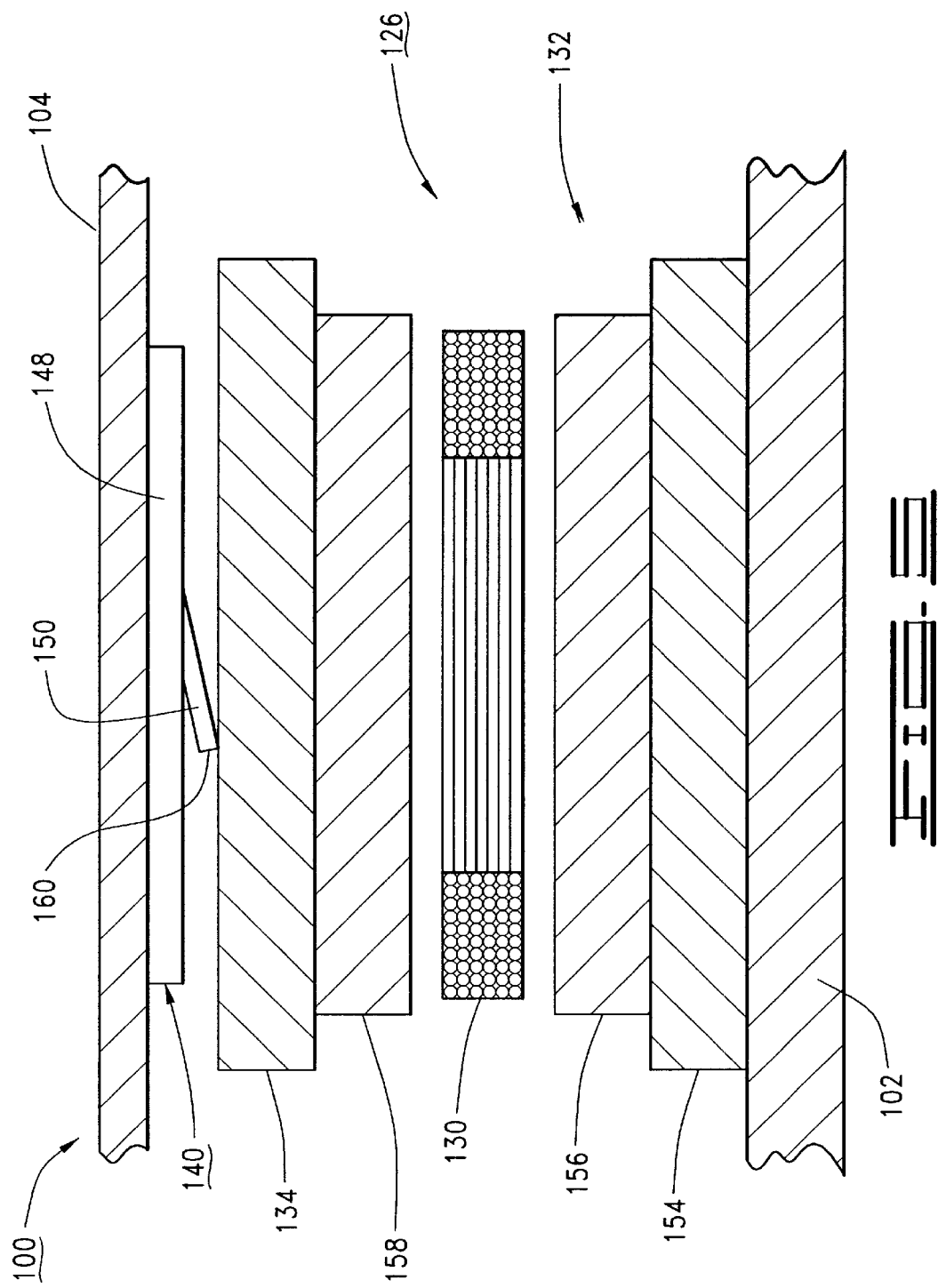

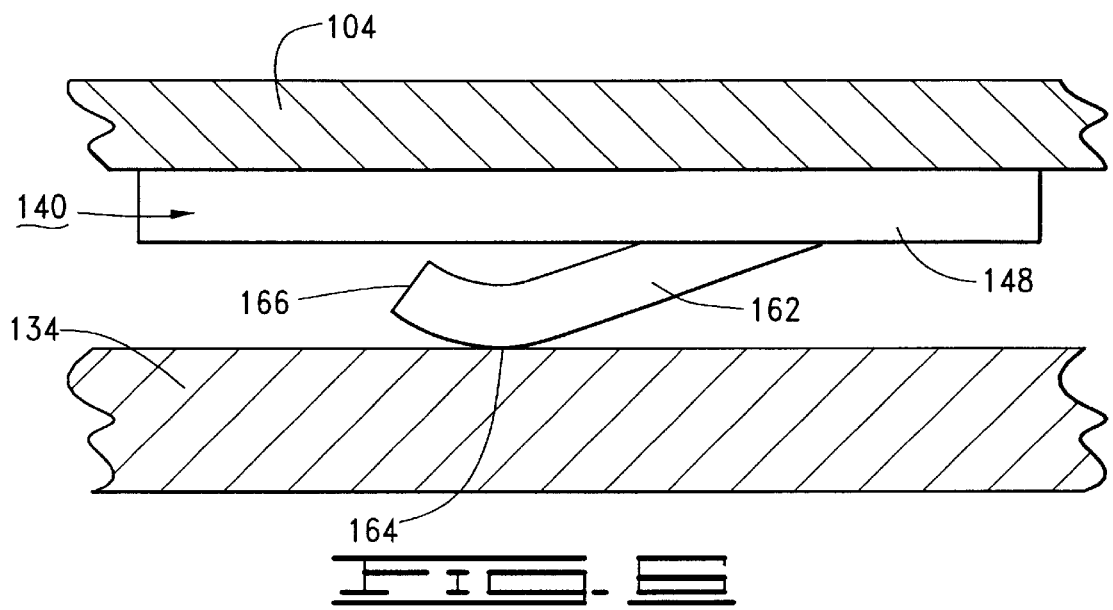
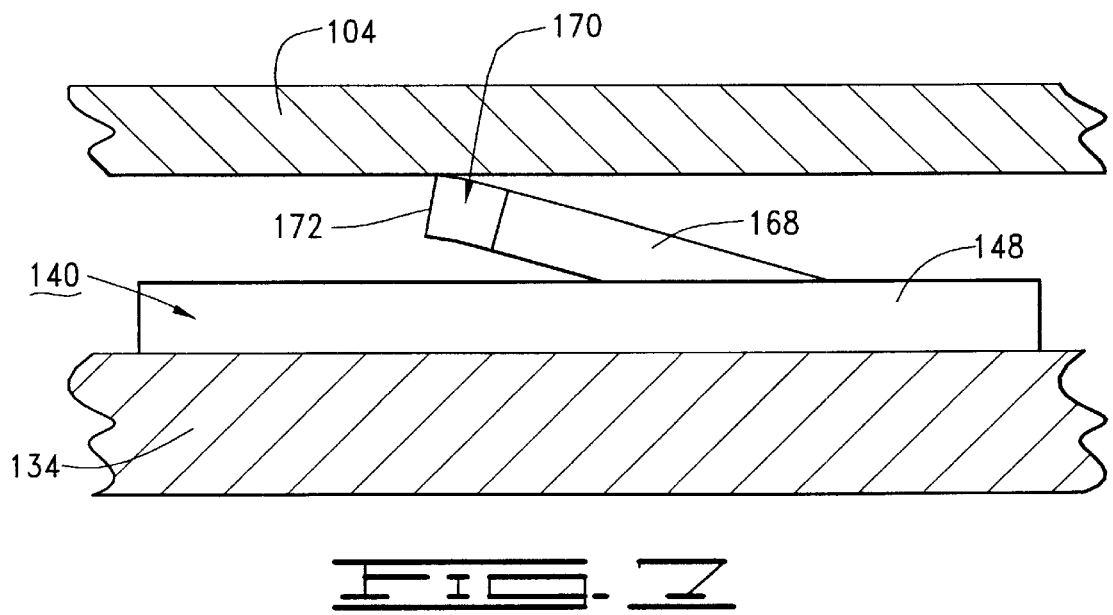

PARALLEL SPRING DESIGN FOR ACOUSTIC DAMPING OF A DISC DRIVE

RELATED APPLICATIONS

This application claims the benefit of U.S. Provisional Application No. 60/277,784 entitled PARALLEL SPRING DESIGN FOR ACOUSTIC DAMPING filed Mar. 21, 2001.

FIELD OF THE INVENTION

The claimed invention relates generally to disc drive data storage devices and more particularly to a damper for damping acoustic noise generated by a disc drive.

BACKGROUND OF THE INVENTION

Disc drives are commonly used for many computer environments to store large amounts of data in a form readily available to a user. Typically, a disc drive has one or more magnetic discs rotated by a spindle motor at a constant high speed. Each disc has a data storage surface divided into a series of concentric data tracks radially spaced across a band having an inner diameter and an outer diameter. The data is stored within the data tracks in the form of magnetic flux transitions. These flux transitions are induced by one or more read/write heads.

Each read/write head includes an interactive element such as a magnetic transducer. The transducer senses the magnetic transitions on a selected data track to either write data to the data track or to read the data stored on the data track. Each of the read/write heads is mounted to a rotary actuator arm and is positioned by the actuator arm over a selected data track to either write data to the data track or to read the data stored on the data track. Each read/write head includes a slider assembly having an air bearing surface that, in response to air currents generated by rotation of the disc, causes the head to fly over the disc. A desired gap separates the read/write head and the corresponding disc.

In a typical application, multiple open-center discs and spacer rings are alternately stacked on a spindle motor hub. The hub that defines a core of the stack also serves to align the discs and the spacer rings about a common axis. The discs, the spacer rings and the spindle motor hub collectively define a disc pack assembly. The read/write heads, which mount on a complementary stack of actuator arms to form part of an actuator assembly, access the surfaces of the stacked discs. The actuator assembly includes features to conduct electrical signals from the read/write heads to a flex circuit, which in turn conducts the electrical signals to a flex circuit connector mounted to a base deck of the disc drive.

When the disc drive is not in use, the read/write heads are parked in a position separate from the data storage surfaces of the discs. A landing zone is typically provided on each of the disc surfaces where the read/write heads are positioned before the rotational velocity of the spinning discs decreases below a threshold velocity necessary to sustain the air bearing. The landing zones are usually located near the inner diameter of the discs.

The actuator assembly typically has an actuator body that pivots about a pivot assembly that is disposed in a medial position of the actuator assembly. A voice coil motor positions a proximal end of the actuator assembly. This positioning of the proximal end of the actuator assembly causes a distal end of the actuator assembly, which supports the read/write heads, to move across the face of the discs.

The coil of the voice coil motor conducts an electrical current. This electrical current through the coil generates an electrical field. The coil is positioned in a magnetic field between an upper pole and a lower pole of the voice coil motor. The electrical filed of the coil interacts with the magnetic generated by the upper pole and the lower pole to cause the actuator assembly to pivot about the pivot assembly.

The pivotal movement of the actuator assembly generates reactionary forces in the stationary magnetic upper pole and lower pole causing the upper pole and the lower pole to vibrate. Because the upper pole and the lower pole are attached to the base deck, the vibration of the upper pole and the lower pole is transmitted throughout the disc drive and, in particular to the top cover. The vibration of the top cover causes the top cover to generate acoustic noise to the surrounding environment.

There have been many attempts to address the problem of undesirable vibration of the voice coil motor. For example, U.S. Pat. No. 5,999,374 issued to Kim (Kim '374) discloses the use of three elastic screw-shaped dampers inserted into bores in an upper yoke (upper pole) to damp vibration. A top of the three elastic dampers tightly presses against an inner surface of a top cover to restrain the motion of the top cover.

U.S. Pat. No. 6,175,469 issued to Ahmad et al. (Ahmad '469) discloses the use of an elastomeric member joined to a magnetically permeable liner to form a dampening member. The dampening member is attached to a top cover of the disc drive and compressed between the top cover and an upper pole of the voice coil motor.

While both the dampers of Kim '374 and the dampening member of Ahmad '469 have been found operable in reducing vibration of the top cover, there remains a need for a device that more effectively reduces acoustic noise generated by the top cover by dissipating the vibrational energy that is generated by the voice coil motor and transmitted to the top cover.

SUMMARY OF THE INVENTION

In accordance with preferred embodiments, a beam damper for a voice coil motor (VCM) of a disc drive is provided to reduce acoustic noise generated by the disc drive. The beam damper reduces the acoustic noise by dissipating vibrational energy of the disc drive.

The disc drive has a top cover and a VCM with a magnetic upper pole. The VCM induces vibrational energy in the disc drive by forces exerted on the upper pole and a lower pole in reaction to electromotive forces that the VCM generates to pivotally move an actuator assembly. The beam damper is affixed to a top cover of the disc drive and supported over the upper pole. The beam damper includes a substantially flat platform, and a series of flex beams extending from the platform and engaging the upper pole to resiliently bias the top cover away from the upper pole.

These and various other features and advantages that characterize the claimed invention will be apparent upon reading of the following detailed description and review of the associated drawings.

BRIEF DESCRIPTION OF THE DRAWINGS

FIG. 5 is a partial cross-sectional, elevation view of a beam damper in conjunction with the voice coil motor of the disc drive.

FIG. 6 is a partial cross-sectional, elevational view of a beam damper in accordance with another preferred embodiment of the present invention.

FIG. 7 is a partial cross-sectional, elevational view of a beam damper in accordance with yet another preferred embodiment of the present invention.

DETAILED DESCRIPTION

Figure 1:
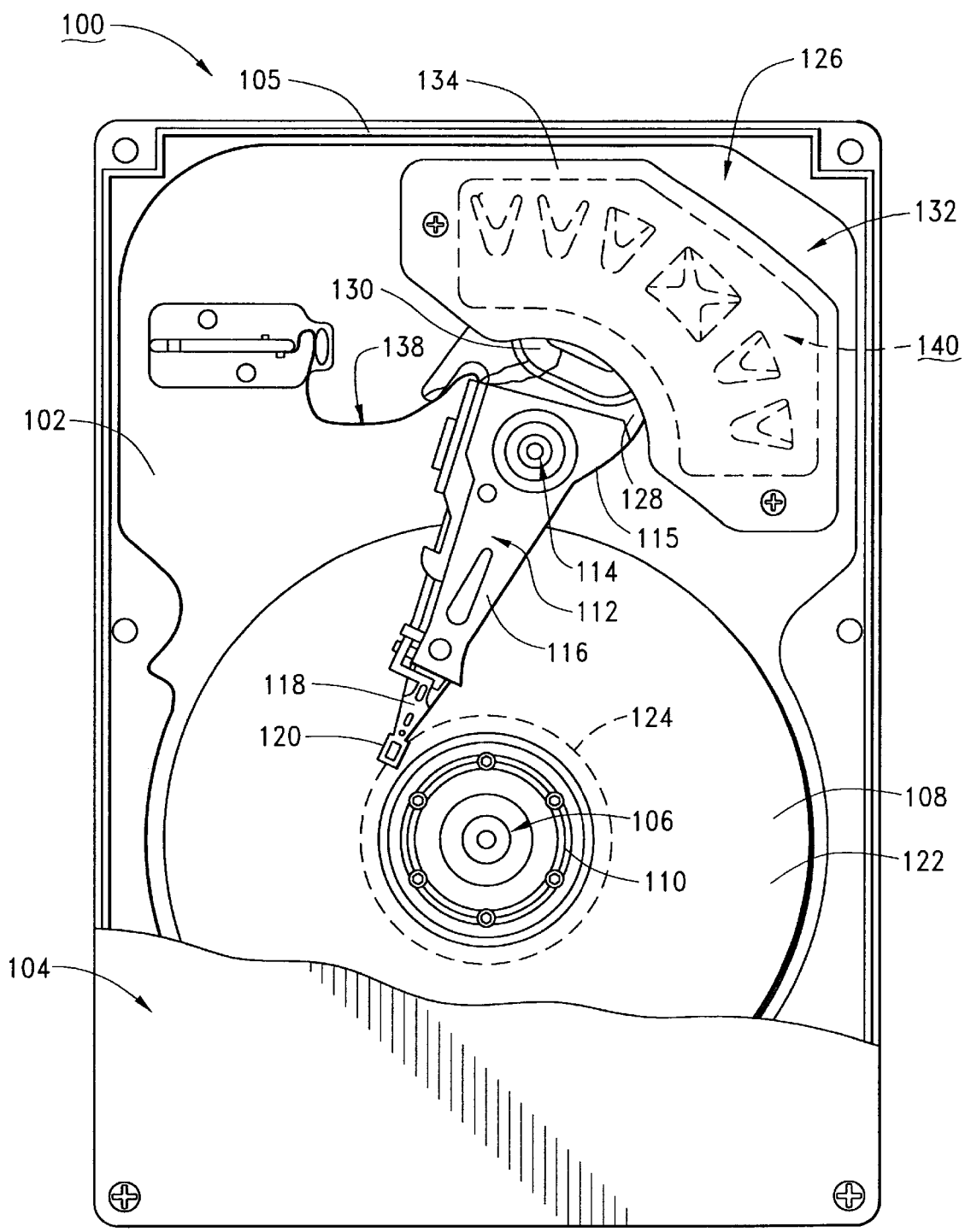
FIG. 1 is a partial cut-away plan view of a disc drive constructed in accordance with preferred embodiments of the present invention.

Referring to the drawings in general, and more particularly to FIG. 1, shown therein is a top view of a disc drive 100 constructed in accordance with preferred embodiments of the present invention. The disc drive 100 includes a base deck 102 to which various disc drive components are mounted. The disc drive also has a cover 104 which, together with the base deck 102 and a gasket 105, form a housing of the disc drive 100.

The top cover 104 is shown in a partial cutaway fashion to expose selected components of interest. Numerous details of construction of the disc drive 100 are not included in the following description because these details of construction are well known to those skilled in the art and are unnecessary to describe the present invention.

A spindle motor 106 is mounted to the base deck 102, and one or more discs 108 are in turn mounted to the spindle motor 106. A clamp ring 110 secures the discs 108 to the spindle motor 106 for rotation at constant high speed. An actuator assembly 112 is located next to the discs 108. The actuator assembly 112 pivots about a pivot bearing assembly 114 in a plane parallel to the discs 108. The actuator assembly includes an E-block 115 supported by the pivot bearing assembly 114. The E-block 115 has actuator arms 116 that support load arm assemblies 118. The load arm assemblies 118, in turn, support read/write heads 120 with each of the read/write heads 120 adjacent a surface of one of the discs 108. The read/write heads 120 are maintained in a data reading or data writing spatial relationship using conventional slider assemblies (not shown), which support the read/write heads 120.

Each of the discs 108 has a data storage location with a data recording surface 122 divided into concentric circular data tracks (not shown) and the read/write heads 120 are located adjacent the data tracks to read data from or write data to the data tracks. The data recording surface 122 has a circular, texturized landing zone 124 near an inner diameter of one of the discs 108 where the read/write head 120 comes to rest when the disc drive 100 is not in use.

The E-block 115 is positioned by a voice coil motor (VCM) 126. The E-block has a coil yoke 128 attached to the E-block 115 at a proximal end of the actuator assembly. The coil yoke 128 supports a coil 130. The coil 130 is immersed in a magnetic field generated by a magnet assembly 132. The magnet assembly 132 includes a pair of steel plates (upper pole 134 and lower pole 136), which in turn support upper and lower permanent magnets (only upper pole 134 is visible in FIG. 1).

The coil 130 is positioned between the upper lower magnets. When an electrical current is passed through the coil 130, an electromagnetic field is established which interacts with magnetic field established by the magnet assembly 132 to cause the coil 130 to move with respect to the magnet assembly 132. The movement of the coil 130 causes the actuator assembly 112 to pivot about the pivot bearing assembly 114 to position the read/write heads in a desired location with respect to the discs 108.

A flex circuit 138 provides the necessary electrical conduction paths between the actuator assembly 132 and a disc drive printed circuit board (not shown). The disc drive printed circuit board mounts to an underside of the base deck 102. The disc drive printed circuit board provides the disc drive read/write circuitry to control operation of the read/write heads 120. The disc drive printed circuit board also provides other interface and control circuitry for the disc drive 100.

FIG. 1 further shows a beam damper 140 (in broken-line fashion). As discussed below, the beam damper 140 is interposed between the top cover 104 and the upper pole 134 to reduce acoustic noise generated by the disc drive 100.

Figure 2:
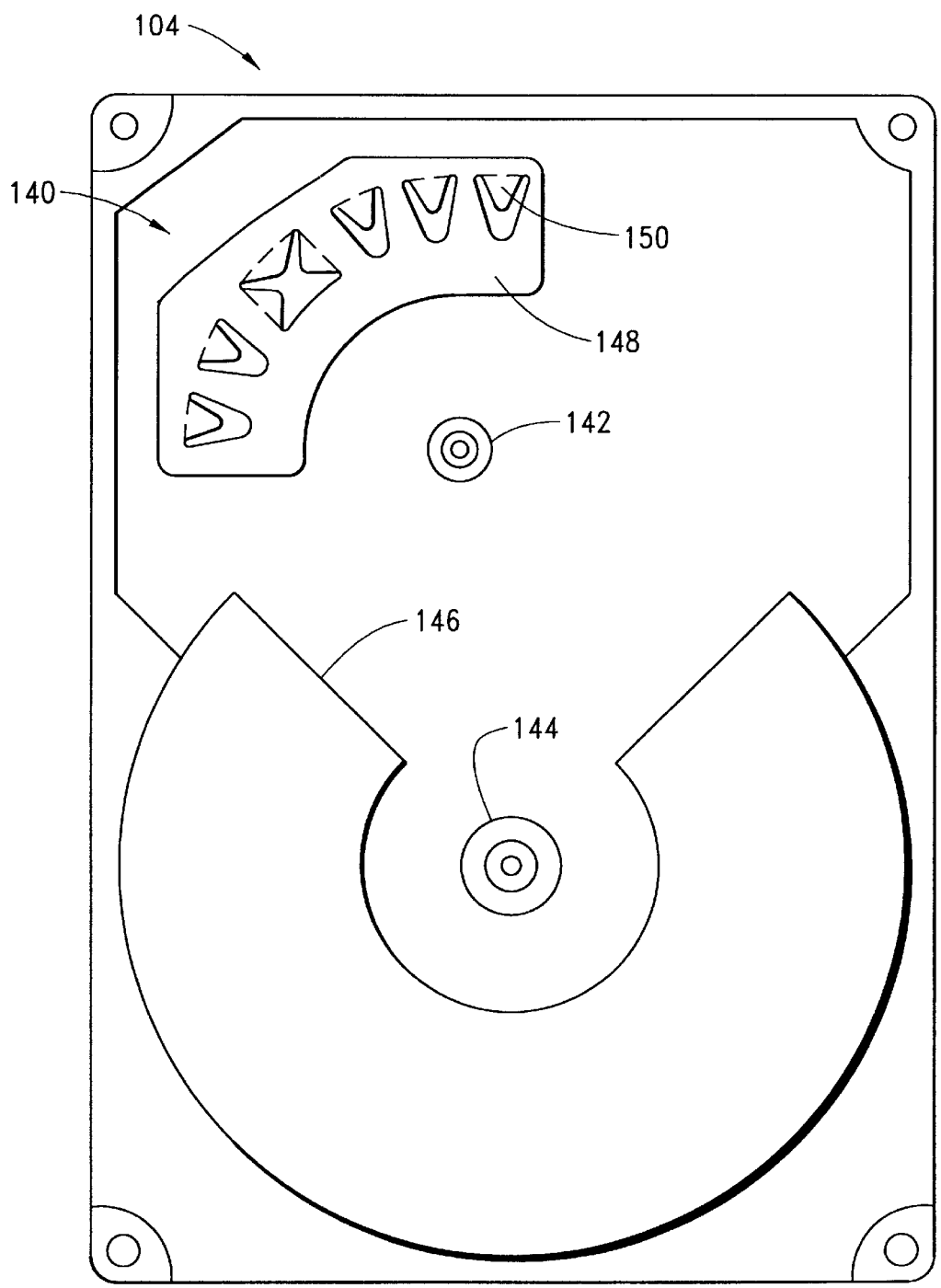
FIG. 2 is a plan view of the inside of the top cover and beam damper of the disc drive of FIG. 1.

FIG. 2 provides a plan view of the interior surface of the top cover 104 to illustrate the beam damper 140 in greater detail. For reference, features of the top cover 104 shown in FIG. 2 include an actuator assembly contact point 142, a spindle motor contact point 144, and a laminate damping structure 146 adjacent the discs 108.

The beam damper 140 is attached to the interior surface of the top cover 104 using a layer of adhesive or other suitable fastening methodology. The beam damper 140 includes a planar base or platform 148 from which a number of flex beams 150 angularly extend. When the top cover 104 is attached to the base deck 102, the flex beams 150 engage the upper pole 134 and resiliently bias the top cover 104 away from the upper pole 134. This biasing is resilient because the flex beams 150 act like springs in this configuration. As such, the flex beams 150 dissipate vibrational energy transmitted to the flex beams 150 through the upper pole 134 while rigidly coupling the top cover 104 to the upper pole 134. Each of the flex beams 150 in the series of flex beams 150 is preferably spaced along a chord (mid-line) of the beam damper 140 as shown.

Figure 3:
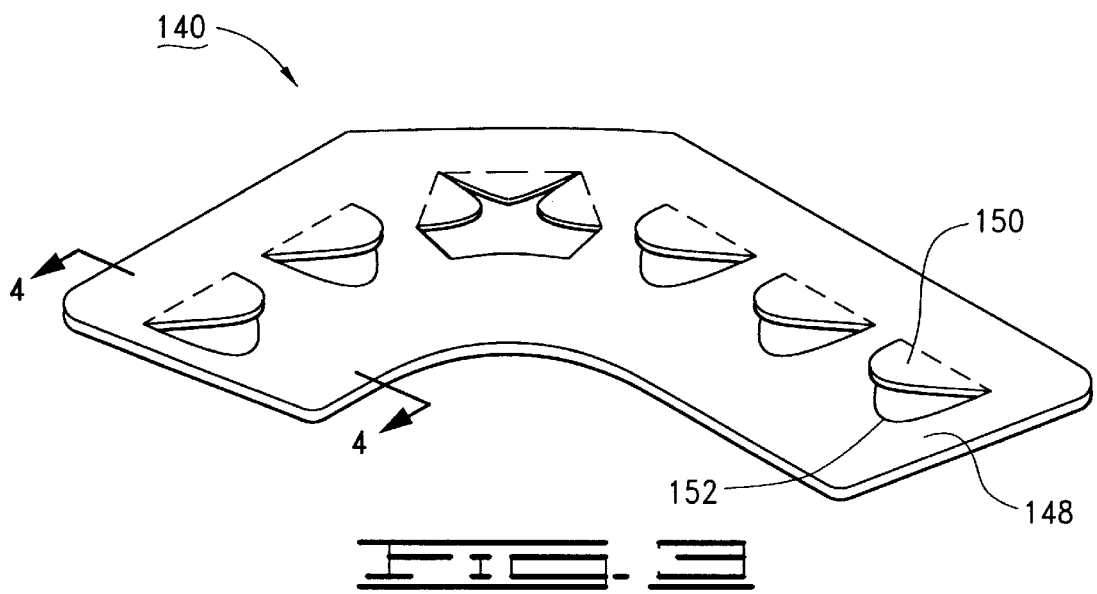
FIG. 3 is an isometric view of the beam damper of FIG. 2.
Figure 4:
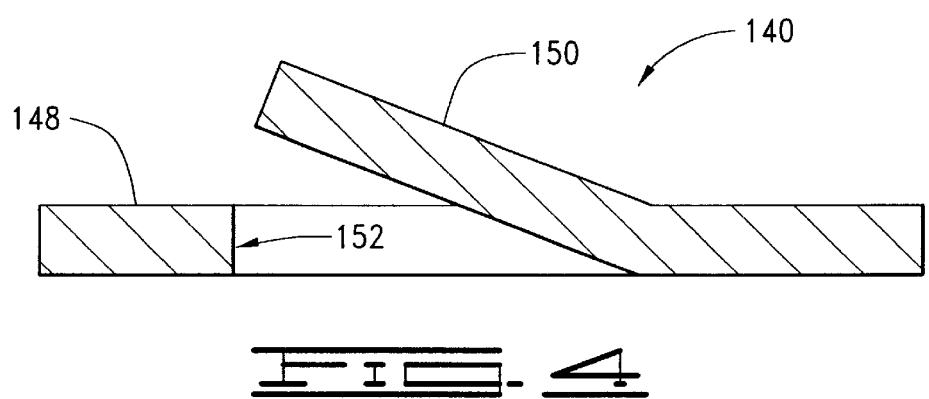
FIG. 4 is a section view of section 4—4 shown in FIG. 3.

FIGS. 3 and 4 show the beam damper 140 in greater detail. FIG. 3 is an isometric view and FIG. 4 is a cross-sectional, elevational view along line 4—4 in FIG. 3. The beam damper 140 is preferably formed from a planar sheet of material, such as stainless steel or other ductile metal. The sheet of material is stamped and cut to provide the desired configuration. It will be noted that the flex beams 150 are cut and bent upwardly at the desired angle, leaving corresponding apertures 152 in the platform 148. The flex beams 150 can retain substantially the same shape as the apertures 152, or a small amount of material can be trimmed from around the flex beams 150 so that the flex beams 150 are smaller than the corresponding apertures 152.

FIG. 5 shows a cross-sectional, elevational view of the beam damper 140 in conjunction with the VCM 126. The magnet assembly 132 of the VCM 126 includes the upper pole 134 as well as a lower pole 154 and upper and lower permanent magnets 156, 158. The coil 130 is shown disposed between the magnets 156, 158. A tip 160 of each flex beam 150 pressingly engages a top surface of the upper pole 134. Vibrations in the magnet assembly 132 induced by rapid movements of the coil 130 are thus damped by the compression of the flex beams 150 between the top cover 104 and the upper pole 134. The desired amount of compression, and resulting damping, can be achieved through appropriate selection of the dimensions of the flex beams 150, the initial angles that the flex beams 150 form with the platform 148, and the modulus of elasticity of the material.

FIG. 6 provides a cross-sectional, elevational view of the beam damper 140 constructed in accordance with another preferred embodiment. More particularly, the beam damper 140 includes flex beams 162 that have a radiused profile as shown. Each flex beam 162 a curved engagement surface 164 which pressingly engages the upper pole so that a tip 166 is not in contact with the upper pole 134. An advantage of this configuration is a reduced likelihood of particle generation from scraping engagement of the beam damper 140 and the upper pole 134.

FIG. 7 provides a cross-sectional, elevational view of the beam damper 140 constructed in accordance with yet another preferred embodiment. The beam damper 140 of FIG. 7 is shown to be attached to the upper pole 134 instead of the top cover 104. The beam damper of FIG. 7 has substantially linear flex beams 168, as shown in the embodiments of FIGS. 1–5, but with the addition of a vibration-absorbent material 170, such as rubber. The material 170 is applied to a tip 172 of each flex beam 168 and improves the damping characteristics of the beam damper 140 as well as serves to reduce particle generation. The vibration-absorbent material can be either a coating or a separate piece of material.

For all of the embodiments of the present invention described above for FIGS. 1–7, the beam damper 140 advantageously resiliently biases the top cover 104 away from the upper pole 134 by reducing the excitation of the top cover 104, thereby providing a more rigid assembly for the distribution of energy. The number of flex beams shown in FIGS. 1–7 are illustrative only and not limiting to the scope of the claimed invention.

It has been observed that beam dampers with different numbers of flex beams provide different damping characteristics for the top cover 104. The particular number and configuration of the flex beams are therefore preferably selected in accordance with the requirements of a given application.

Generally, it is desirable to use as many flex beams for a beam damper that the manufacturing limitations permit because the vibrational energy dissipated by the flex beams will generally be greater, and the vibrational energy will tend to be distributed over a larger area, with a larger number of flex beams. Furthermore, the use of more flex beams allows some variations in the stiffness of each of the flex beams without greatly affecting the overall energy dissipation by the beam damper.

It will now be appreciated that the beam damper 140 presents several advantages over the prior art. The beam damper 140 is easily manufactured and installed, which are important considerations in a high volume disc drive manufacturing environment. The operation of the flex beams 150, 162, 168 as leaf springs provides improved coupling between the top cover 104 and the upper pole 134 as compared to a sandwiched, compressible material as disclosed by Kim '374 and Ahmad '469. The flex beams further provide improved damping of vibrations in a direction parallel to the direction of movement of the coil 130, and unlike compressed materials, will not tend to relax and lose resilience over time. The desired damping characteristics can readily be obtained through proper selection of the number and configuration of flex beams.

While the foregoing embodiments have disposed the beam damper 140 between the top cover 104 and the upper pole 134, such configurations have been for purposes of illustration and are not necessarily limiting to the invention as claimed below. Thus, it is readily contemplated, for example, that the beam damper 140 can be disposed between the base deck 102 and the lower pole 154, as desired.

It will be understood that the present invention (as embodied herein and claimed below) is for a beam damper (such as 140) for a VCM (such as 126) of a disc drive (such as 100) to reduce acoustic noise generated by the disc drive. The beam damper reduces the acoustic noise by dissipating vibrational energy of the disc drive. The disc drive 100 has a top cover 104 and a VCM 126 with a magnetic upper pole 134. The VCM induces vibrational energy in the disc drive by forces exerted on the upper pole and a lower pole in reaction to electromotive forces that the VCM generates to pivotally move an actuator assembly (such as 112). The beam damper is attached to the top cover to align with the upper pole when the top cover is attached to a base deck (such as 102). The beam damper includes (a) a substantially flat platform (such as 148); and (b) a number of flex beams (such as 150, 162, 168) extending from the platform and engaging the upper pole to resiliently bias the top cover away from the upper pole of the VCM.

In the appended claims, the recited function performed by the first means will be understood as being carried out by the disclosed beam damper 140 having a platform 148 affixed to a pole 134 or a housing member (such as top cover 104). A number of flex beams 150, 162 and 168 extend at a desired angle from the platform 148 and engage the remaining one of the housing 104 and pole 134. The beam damper 140 is formed from a ductile metal so that the flex beams operate substantially as leaf springs. Accordingly, a layer of compressible foam rubber or other elastic dampers such as disclosed by Kim '374 and Ahmad '469 are not included within the scope of the claim, and are explicitly excluded from the definition of an equivalent structure to that claimed.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application for the beam damper while maintaining the same functionality without departing from the spirit and scope of the present invention.

In addition, although the embodiments described herein are directed to a beam damper for a disc drive, it will be appreciated by those skilled in the art that the beam damper can be used for other devices in which the generation of acoustic noise is a problem, without departing from the spirit and scope of the claimed invention.

What is claimed is:

1. A beam damper for a voice coil motor of a disc drive, the disc drive having a top cover and the voice coil motor having a magnetically permeable upper pole wherein the beam damper is between the upper pole and the top cover, the beam damper comprising:
   (a) a substantially flat platform; and
   (b) a series of flex beams extending from the platform and engaging the upper pole to resiliently bias the top cover away from the upper pole of the voice coil motor.

2. The beam damper of claim 1 wherein a material of the beam damper is a ductile metal.

3. The beam damper of claim 1 wherein a tip of each flex beam is covered with a vibration-absorbing material.

4. The beam damper of claim 1 wherein the flex beams are spaced substantially along a chord of the platform.

5. The beam damper of claim 1 wherein each flex beam has a radiused profile which provides a curved contact surface which pressingly engages the upper pole.

6. The beam damper of claim 1 comprising at least four flex beams.

7. The beam damper of claim 1 formed by a process comprising steps of providing a planar sheet of material, stamping the planar sheet of material to form the platform and the flex beams, and bending the flex beams at a desired angle with respect to the platform.

8. A disc drive comprising:
 (a) a housing;
 (b) a rotatable disc supported within the housing;
 (c) a voice coil motor having a pole comprising a layer of magnetically permeable material; and
 (d) a beam damper for the voice coil motor disposed between the housing and the pole, comprising:
  (d1) a substantially flat platform affixed to a selected one of the housing and the pole; and
  (d2) a number of flex beams extending from the platform at a selected angle with respect to the platform, each flex beam engaging the remaining one of the housing and the pole to resiliently bias the housing with respect to the voice coil motor.

9. The disc drive of claim 8 further comprising an actuator assembly which supports a head adjacent the disc, wherein the voice coil motor pivots the actuator assembly to move the head with respect to the disc, and wherein the beam damper reduces vibrations induced in the voice coil motor in response to pivotal movement of the actuator assembly.

10. The disc drive of claim 8 wherein a tip of each flex beam is covered with a vibration-absorbing material.

11. The disc drive of claim 8 wherein the number of flex beams is greater than one and the flex beams are spaced substantially along a chord of the platform.

12. The disc drive of claim 8 wherein a material of the beam damper is a ductile metal.

13. The disc drive of claim 8 wherein each flex beam has a radiused profile which provides a curved contact surface which pressingly engages the remaining one of the housing and the pole.

14. The disc drive of claim 8 wherein the number of flex beams comprises at least four.

15. The disc drive of claim 8 wherein the beam damper is formed by a process comprising steps of providing a planar sheet of material, stamping the planar sheet of material to form the platform and the number of flex beams, and bending each of the flex beams at a desired angle with respect to the platform.

16. A disc drive, comprising:
 (a) a housing;
 (b) a rotatable disc supported within the housing;
 (c) a voice coil motor having a pole comprising a layer of magnetically permeable material; and
 (d) first means for reducing acoustic noise generated by the disc drive by resiliently biasing the housing with respect to the voice coil motor.

17. The disc drive of claim 16, wherein the first means comprises a beam damper for the voice coil motor disposed between the housing and the pole, comprising:
 (d1) a substantially flat platform affixed to a selected one of the housing and the pole; and
 (d2) a number of flex beams extending from the platform at a selected angle with respect to the platform, each flex beam engaging the remaining one of the housing and the pole to resiliently bias the housing with respect to the voice coil motor.

18. The disc drive of claim 17 further comprising an actuator assembly which supports a head adjacent the disc, wherein the voice coil motor pivots the actuator assembly to move the head with respect to the disc, and wherein the beam damper reduces vibrations induced in the voice coil motor in response to pivotal movement of the actuator assembly.

19. The disc drive of claim 17 wherein the number of flex beams is greater than one.

20. The disc drive of claim 17 wherein the beam damper is formed by a process comprising steps of providing a planar sheet of material, stamping the planar sheet of material to form the platform and the number of flex beams, and bending each of the flex beams at a desired angle with respect to the platform.

* * * * *